(12) United States Patent
Burke et al.

(10) Patent No.: US 11,745,635 B2
(45) Date of Patent: Sep. 5, 2023

(54) TRAILER WITH KICKER ROLLERS

(71) Applicant: Brandt Industries Inc., Regina (CA)

(72) Inventors: Brett Burke, Edmonton (CA); Stuart Humphrey, Leduc (CA); Raymond Strelic, Regina (CA); Lee Engemoen, Saskatoon (CA)

(*) Notice: Subject to any disclaimer, the term of this patent is extended or adjusted under 35 U.S.C. 154(b) by 323 days.

(21) Appl. No.: 16/835,653

(22) Filed: Mar. 31, 2020

(65) Prior Publication Data
US 2021/0300228 A1 Sep. 30, 2021

(51) Int. Cl.
*B60P 1/52* (2006.01)
*B62D 53/06* (2006.01)
*B62D 63/08* (2006.01)

(52) U.S. Cl.
CPC .............. *B60P 1/52* (2013.01); *B62D 53/061* (2013.01); *B62D 63/08* (2013.01)

(58) Field of Classification Search
CPC .......... B60P 1/52; B62D 53/061; B62D 63/08
USPC ......................................................... 414/537
See application file for complete search history.

(56) References Cited

U.S. PATENT DOCUMENTS

| | | | | |
|---|---|---|---|---|
| 4,806,061 A | * | 2/1989 | Fenton | B60P 1/52 414/475 |
| 4,967,894 A | * | 11/1990 | Thunnissen | B60P 1/52 193/35 SS |
| 5,102,286 A | * | 4/1992 | Fenton | B60P 1/52 414/529 |
| 5,246,330 A | | 9/1993 | Marmur et al. | |
| 5,478,190 A | * | 12/1995 | Helton | B60P 1/52 193/35 A |
| 5,921,742 A | | 7/1999 | Gearhart | |
| 7,465,143 B1 | * | 12/2008 | Adams | B60P 1/52 193/35 A |
| 7,802,958 B2 | * | 9/2010 | Garcia | B60P 1/52 414/535 |
| 2007/0057120 A1 | * | 3/2007 | McConnell | B60P 1/52 244/118.1 |
| 2009/0220325 A1 | * | 9/2009 | Berney | B60P 1/6454 414/469 |
| 2010/0096903 A1 | * | 4/2010 | Hogervorst | B62D 53/061 298/17 SG |
| 2011/0175397 A1 | * | 7/2011 | Amrine, Jr. | B62D 53/061 296/184.1 |
| 2012/0141241 A1 | * | 6/2012 | Kordel | B60P 1/52 414/535 |
| 2017/0349226 A1 | * | 12/2017 | Oren | B60S 9/02 |

* cited by examiner

*Primary Examiner* — Kaitlin S Joerger
(74) *Attorney, Agent, or Firm* — FROST BROWN TODD LLP

(57) ABSTRACT

A trailer is provided for accommodating different lengths of loads. The trailer can have a hitch assembly connectable to a tow vehicle, a deck assembly positioned behind the hitch assembly, an axle assembly having at least two axles and wheels provided on the at least two axles, a first kicker roller adjacent a first side of the deck assembly and positionable in a loading position and a transport position and a second kicker roller adjacent a second side of the deck assembly and positionable in a loading position and a transport position.

17 Claims, 7 Drawing Sheets

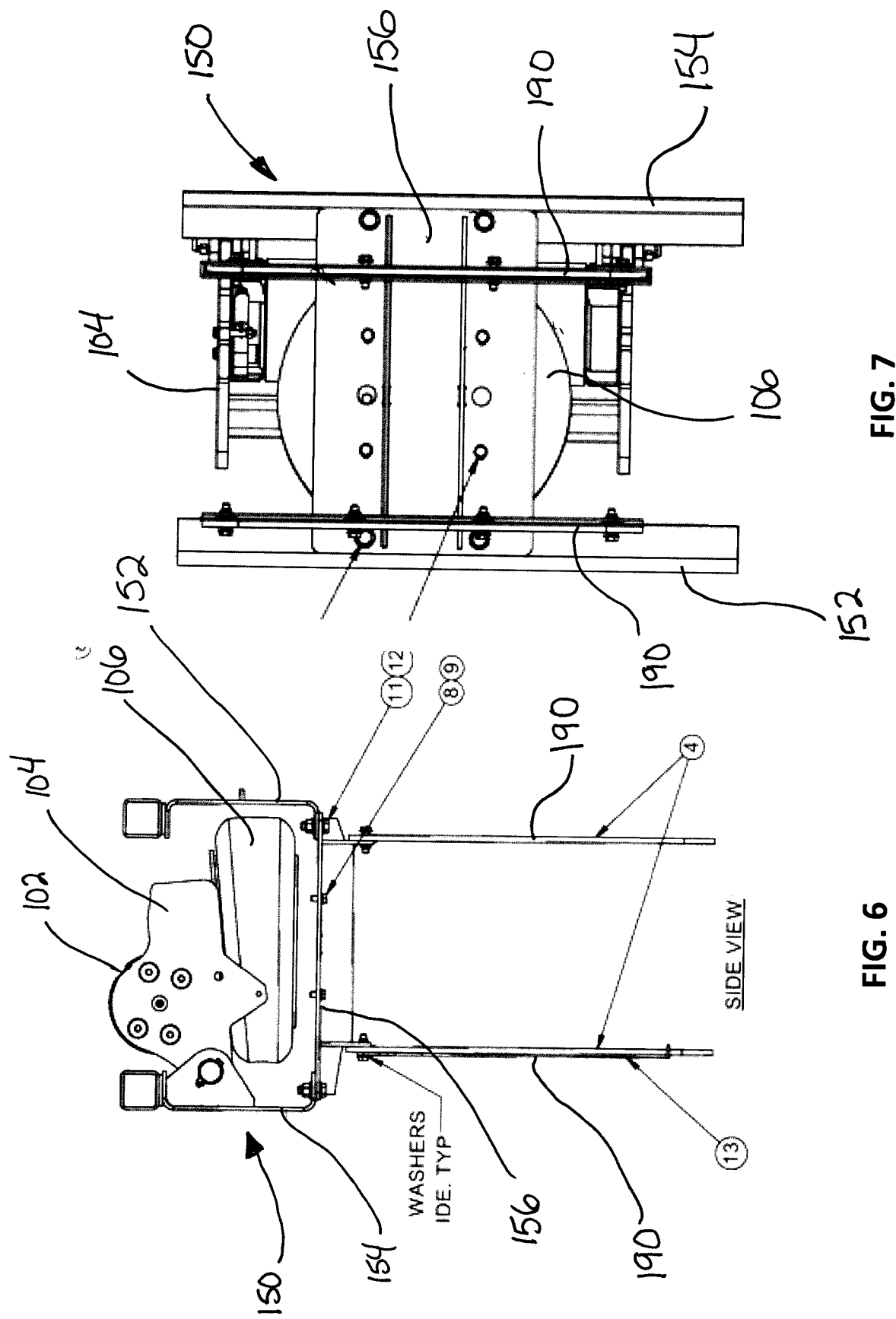

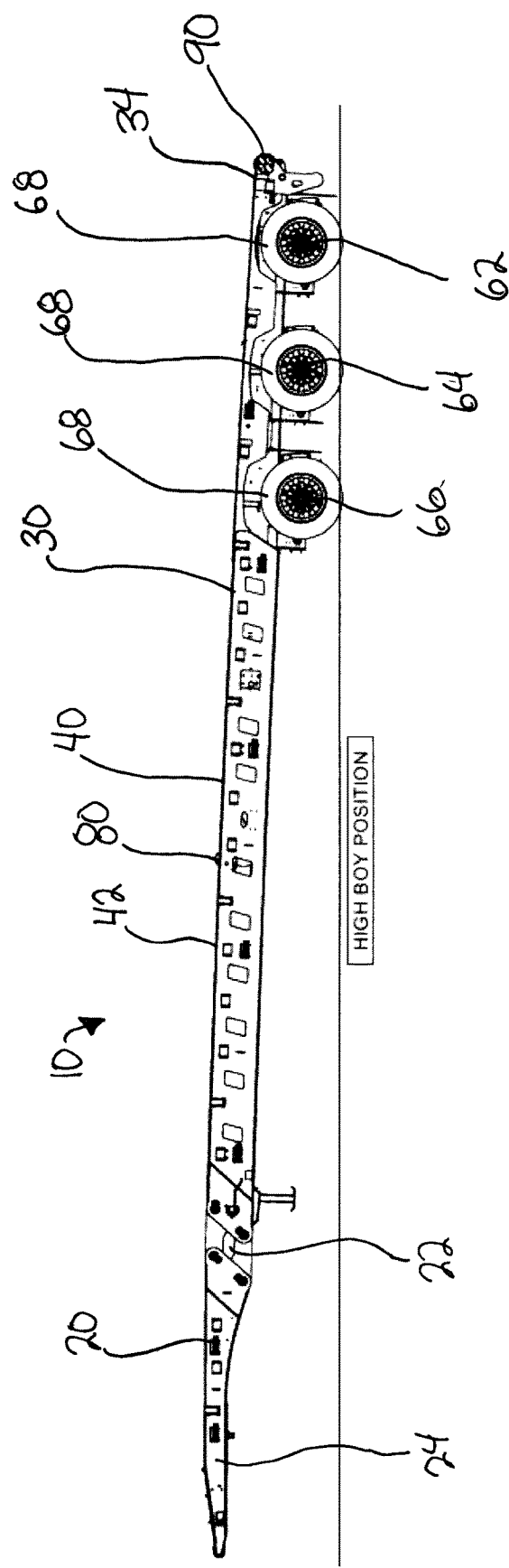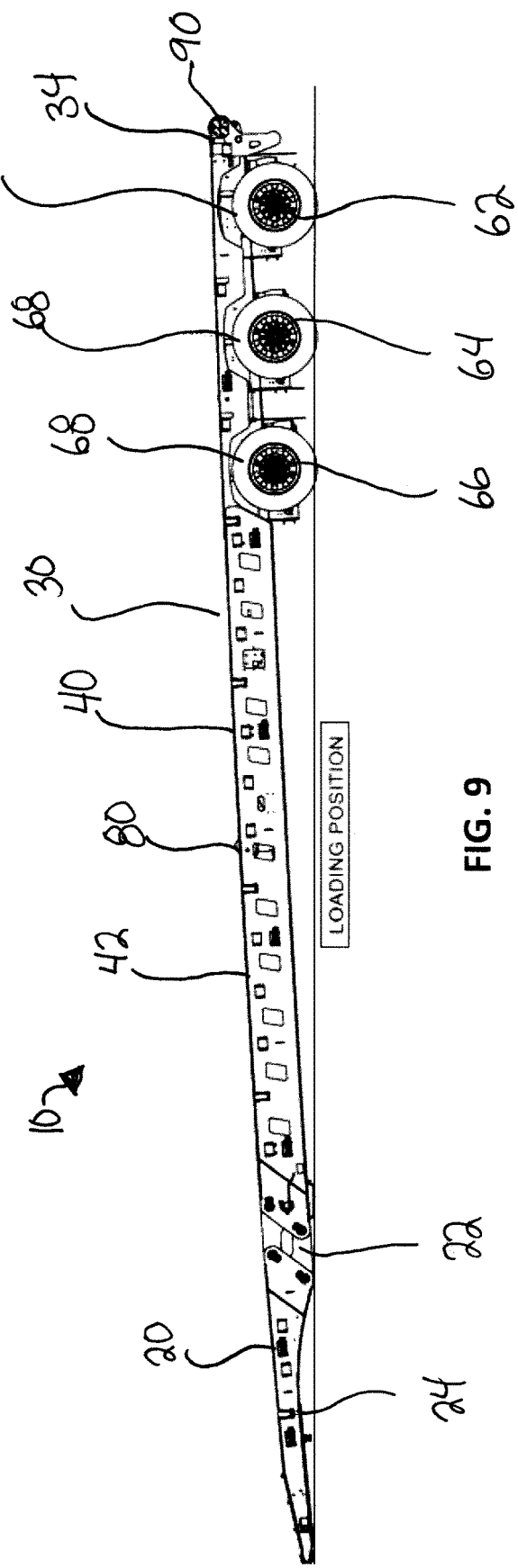

TRAILER WITH KICKER ROLLERS

The present invention relates to a trailer for hauling longer loads and more particularly to a trailer having rollers, and specifically kicker rollers, to aid with the loading and unloading of the trailer.

BACKGROUND

Some flat bed trailers use rollers to aid in loading and unloading loads onto the deck of the trailer. Commonly, loads are winched onto and off of these trailers with the rollers allowing the load to "roll" along the deck of the trailer instead of being dragged along it. However, various lengths of loads cause issues on where to place these rollers. While longer loads may work fine being loaded or unloaded with a roller placed near the middle of the trailer or closer to a front of a trailer, shorter loads may not reach this middle roller causing the load to be dragged along the decking for some distance before it comes into contact with this middle roller.

SUMMARY OF THE INVENTION

In an aspect, a trailer is provided for accommodating different lengths of loads. The trailer can have a hitch assembly connectable to a tow vehicle, a deck assembly positioned behind the hitch assembly and having a front end, a rear end, a first side and a second side, an axle assembly having at least two axles and wheels provided on the at least two axles, a first kicker roller adjacent the first side of the deck assembly and positionable in a loading position and a transport position and a second kicker roller adjacent the second side of the deck assembly and positionable in a loading position and a transport position. The deck assembly can have decking having a top surface

DESCRIPTION OF THE DRAWINGS

A preferred embodiment of the present invention is described below with reference to the accompanying drawings, in which:

FIG. 6 is a side view of the kicker roller shown in FIG. 5;
FIG. 7 is a bottom view of the kicker roller shown in FIG. 6;
FIG. 8 is the trailer of FIG. 1 in an unloading position;
and
FIG. 9 is the trailer of FIG. 1 in a loading position.

DETAILED DESCRIPTION OF THE ILLUSTRATED EMBODIMENTS

Figure 1:
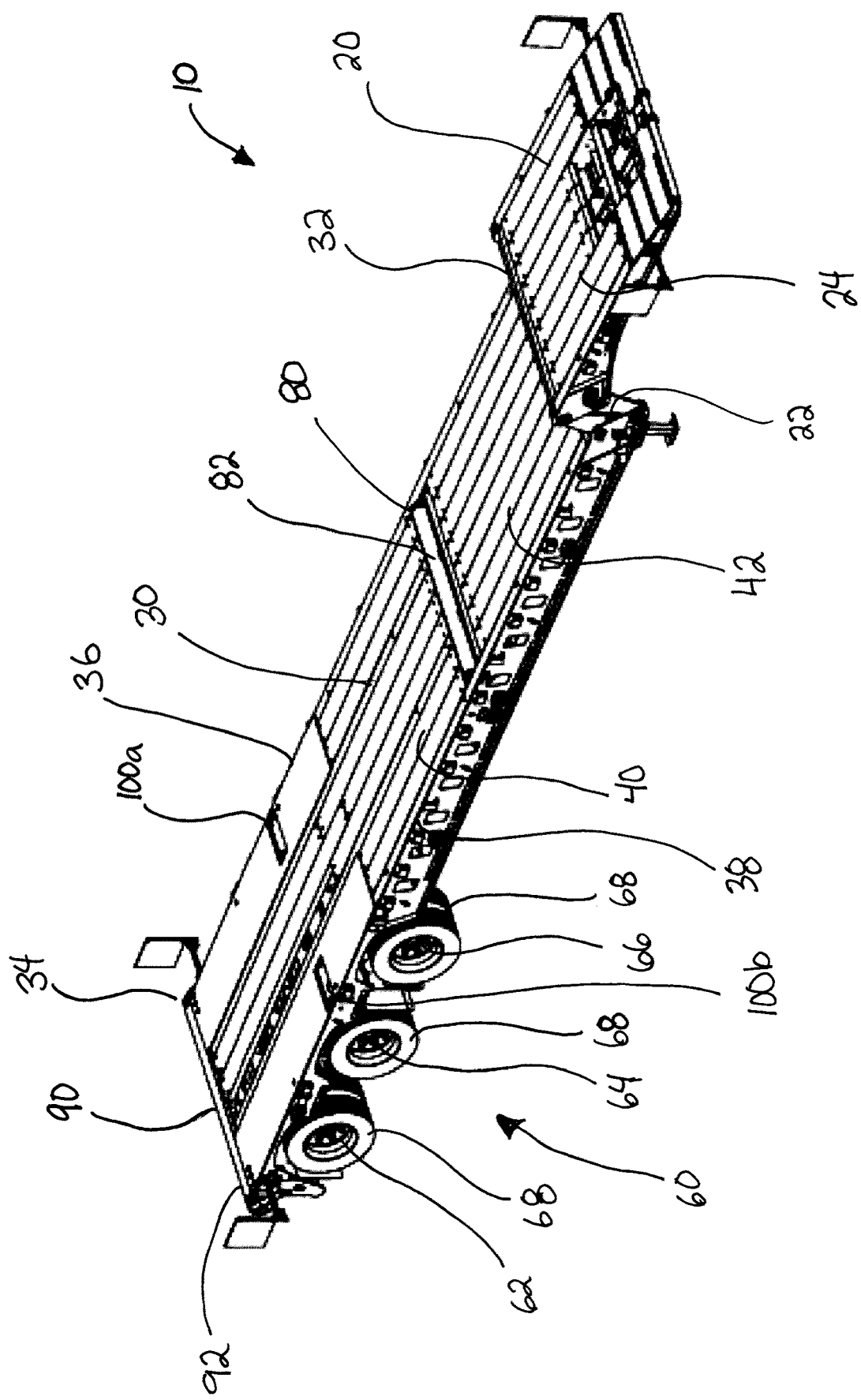
FIG. 1 is a perspective view of a trailer with kicker rollers positioned on a deck.
Figure 2:
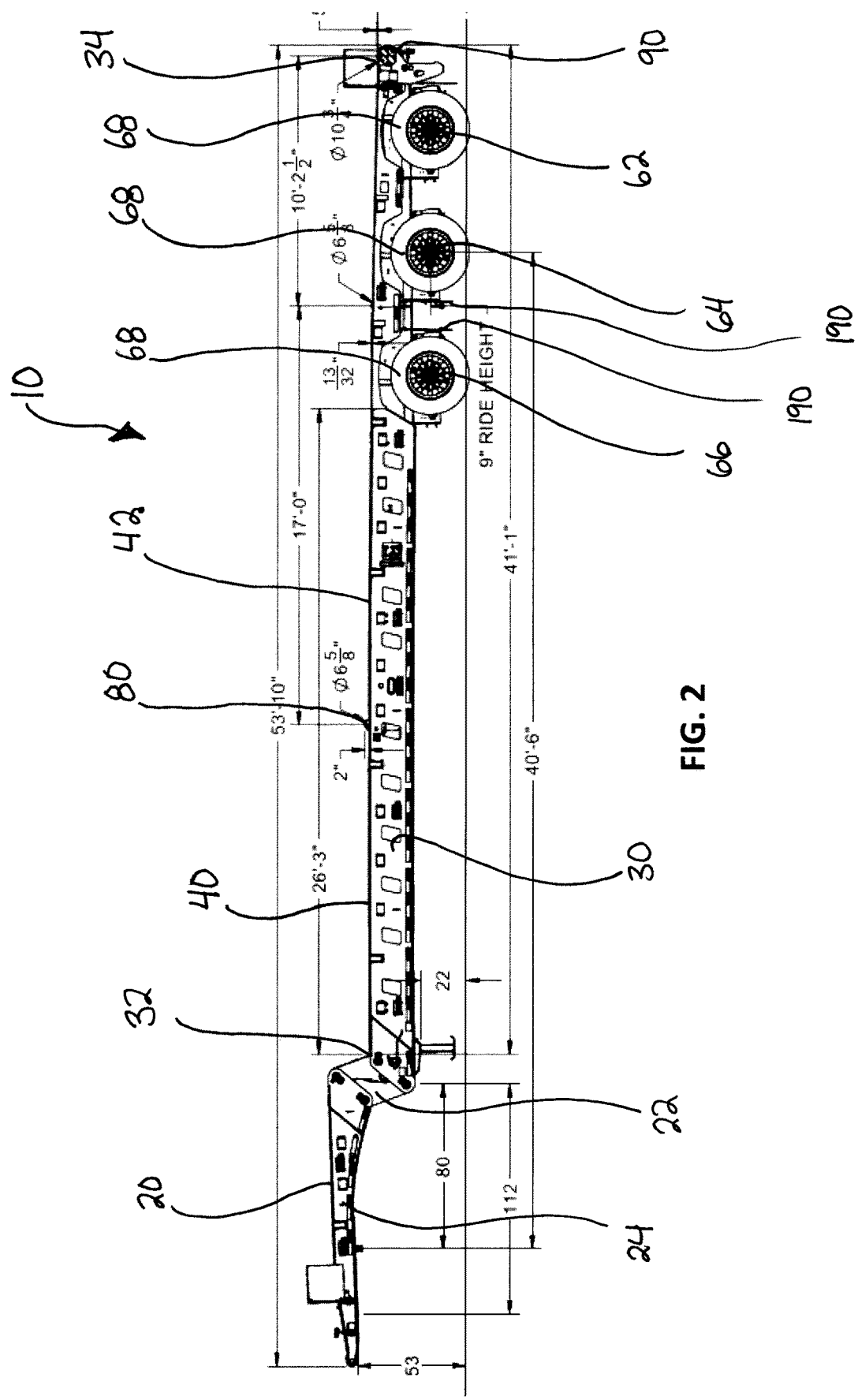
FIG. 2 is a side view of the trailer, shown in FIG. 1.
Figure 3:
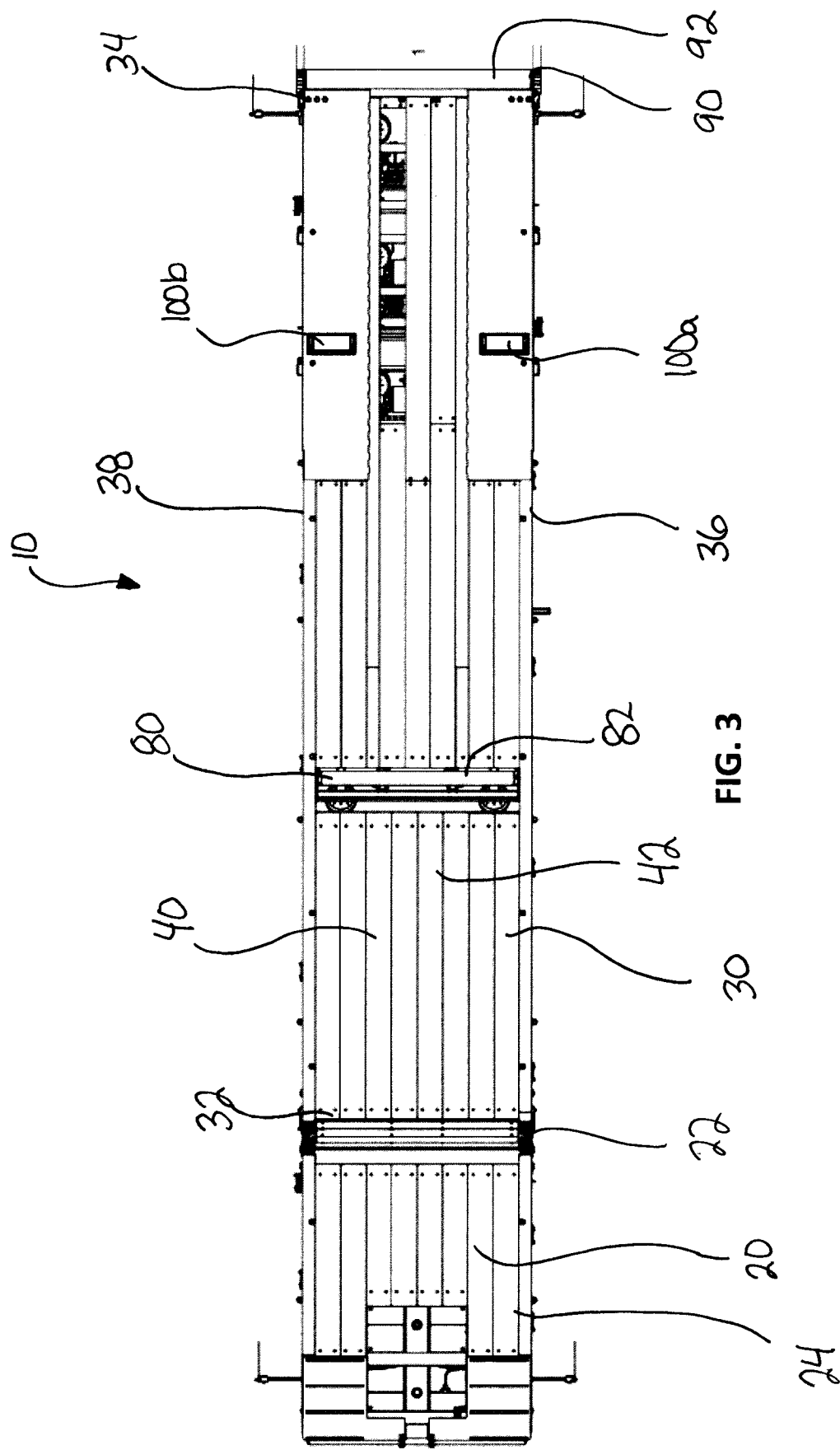
FIG. 3 is a top view of the trailer shown in FIG. 1.

FIGS. 1-3 illustrate a trailer 10 for hauling heavy articles, like skid mounted equipment, rig shacks, containers, etc. The trailer 10 can have a hitch assembly 20, a deck assembly 30, and an axle assembly 60 having axles 62, 64, 66 with corresponding wheels 68.

The hitch assembly 20 can be used to connect the trailer 10 to a tow vehicle, such as a tractor unit (not shown), to allow the trailer 10 to be pulled by the tow vehicle.

The deck assembly 30 can be positioned behind and connected to the hitch assembly 20, at a front end 32 of the deck assembly 30. The deck assembly 32 can extend from the front end 32 of the deck assembly 30 to a rear end 34 of the deck assembly 34 and a rear end of the trailer 10. The deck assembly 30 is used to carry a load on the trailer 10.

In one aspect, the hitch assembly 20 can be a folding goose neck that allows the trailer to be placed in a transport position, as shown in FIGS. 1-3, a "high boy" position with the neck 24 of the hitch assembly 20 and the deck assembly 30 being substantially aligned for carrying longer loads where the length of the deck assembly 30 is not long enough to accommodates the load, as shown in FIG. 8, and a loading position with the neck 24 of the hitch assembly 20 and the deck assembly 30 being substantially aligned for driving wheeled or tracked equipment up the neck 24 of the hitch assembly 20 and onto the deck assembly 30 of the trailer 10, as shown in FIG. 9. An interconnecting joint 22 can be provided pivotally connected at a first end to the front end 32 of the trailer 10 and pivotally connected at a second end to a neck 24. The interconnecting joint 22 allows the neck 24 of the hitch assembly 20 to be moved above the deck assembly 30 to be placed in the transport position or substantially aligned with the decking assembly 30 to place the trailer in the "high boy" and loading positions.

Decking 40, having a top surface 42, can be provided on the deck assembly 30 to support a load on the deck assembly 30, with the decking 40 covering the deck assembly 30 from the front end 32 of the deck assembly 30 to a rear end 34 of the deck assembly 30.

The axle assembly 60 with the rear axle 62, middle axle 64, front axle 66 and wheels 68 support the trailer 10 and any load positioned on the deck assembly 30 of the trailer 10. The axle assembly 60 can be provided below the deck assembly 30 near a rear end 34 of the deck assembly 30. FIGS. 1-3 show the trailer 10 having three sets of axles 62, 64, 66 with associated wheels 68, but more or fewer axles could be used.

To load and unload loads on the decking 40 of the trailer 10, a number of rollers can be provided to help the large loads be moved along the decking 40 on the rollers when the load does not have wheels instead of the load being dragged along the top surface 42 of the decking 40.

A belly roller 80 and a rear roller 90 can be provided for aiding in loading a load onto the decking 30 of the trailer 10. The belly roller 80 can be provided half way or more towards the front end 32 of the deck assembly 30, so that in one aspect the belly roller 80 can be positioned closer to the front end 32 of the deck assembly 30 than the back end 34 of the deck assembly 30. The belly roller 80 can include a retractable roller 82 running substantially the full width of the decking 40. The roller 82 can rotate freely so that a load can roll over this belly roller 80. The retractable roller 82 can be positioned in a loading position or a transport position. In the loading position, the roller 82 of the belly roller 80 can be extended above a top surface 42 of the decking 40 so that a load can roller over the belly roller 80. In the transport position, the roller 82 of the belly roller 80 can be retracted below the top surface 42 of the decking 40 so that a load can rest on the top surface 42 of the decking 40.

The rear roller 90 can be provided at the rear end 34 of the deck assembly 30 and include a roller 92 extending substantially the full width of the decking 40. The roller 92 can rotate freely so that a load can roll over the rear roller 90.

A first kicker roller 100a and a second kicker roll 100b can also be provided in the deck assembly 30 to aid in loading shorter loads. The first kicker roller 100a can be provided in the decking 40 within 12' of the rear end 34 of the deck assembly 30, adjacent a first side 36 of the trailer 10. The first kicker roller 100a can be provided behind the front axle 66, but in front of the middle axle 64, in one aspect. The second kicker roller 100b can be provided in the decking 40 within 12' of the rear roller 90, adjacent a second side 38 of the trailer 10. The second kicker roller 100b can be provided behind the front axle 66, but in front of the middle axle 64, in one aspect. The first kicker roller 100a and the second kicker roller 100b can be positioned the same distance from the rear end 34 of the deck assembly 30 so that the rear end 34 of the deck assembly 30 is substantially equidistant from the first and second kicker rollers 100a, 100b.

Unlike the belly roller 80 and the rear roller 90 that can extend along substantially the entire width of the decking 40 of the trailer 10, the first kicker roller 100a and the second kicker roller 100b can extend partially across the width of the decking 40. With the first kicker roller 100a and the second kicker roller 100b only extending a short distance across the width of the decking 40 from the first side 36 of the deck assembly 30 and the second side 38 of the deck assembly 30, respectively, defining a space between the first kicker roller 100a and the second kicker roller 100a with decking 40 provided in this space.

The belly roller 80 can be provided between the first and second kicker roller 100a, 100b and the front end 32 of the deck assembly 30 of the trailer 30, so that a load moving along the deck assembly 30 from the rear end 34 of the deck assembly 30 to the front end 32 of the deck assembly 30, will come into contact with the first and second kicker rollers 100a, 100b before it comes into contact with belly roller 80.

Figure 4:
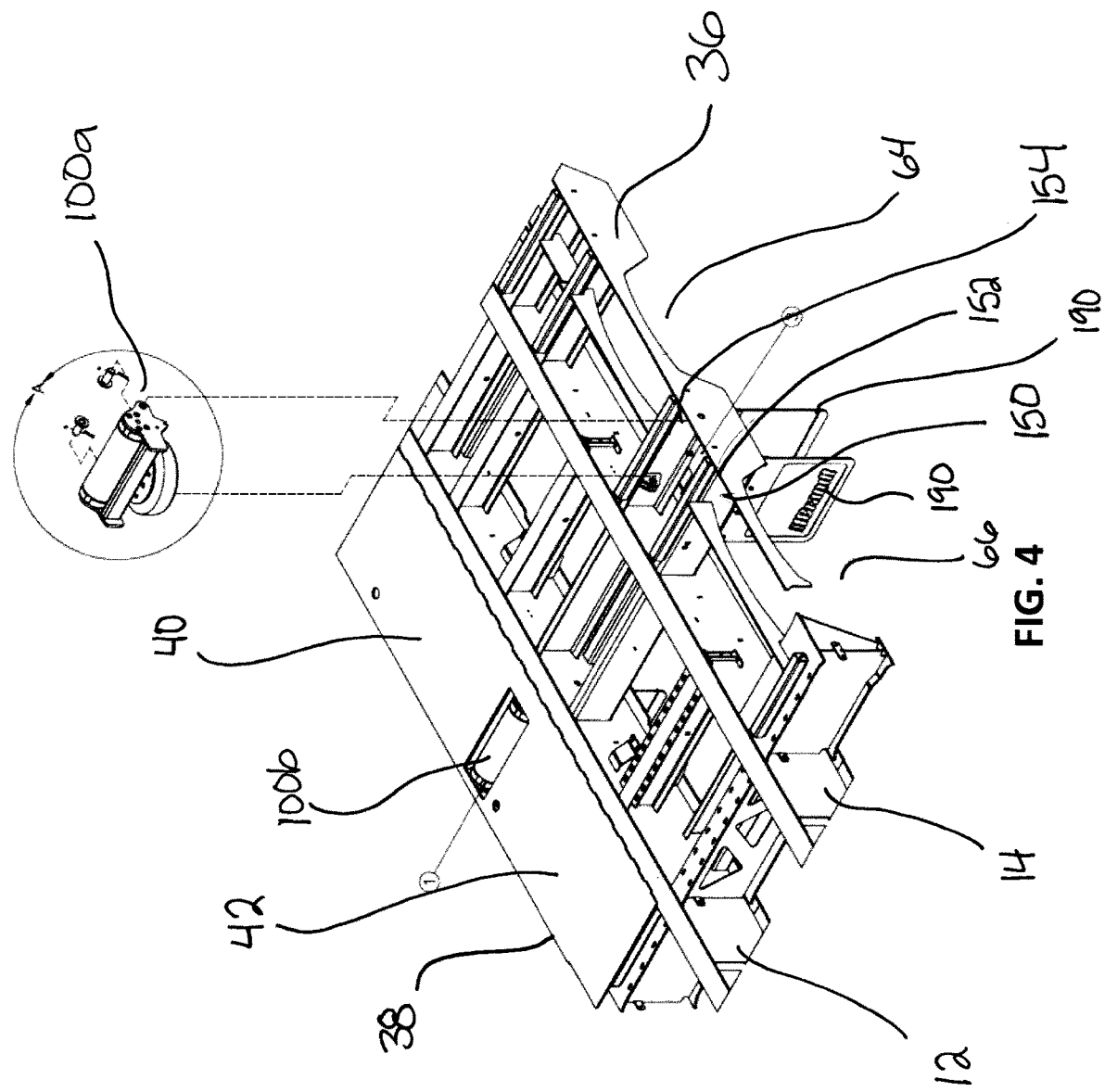
FIG. 4 is a detail view of a cutaway of the trailer showing the placement of kicker rollers.

Referring to FIG. 4, first kicker roller 100a and the second kicker roller 100b can be provided on the trailer 10 between the front axle 66 and the middle axle 64 in a bolster structure 150. Because of the limited space available between the front axle 66 and the middle axle 64 and the wheels 68 connected to the axles 66, 64, the first kicker roller 100a and the second kicker roller 100b must be relatively compact in size and extend only a short distance across the width of the decking 40 and fit within the bolster structure 150. However, the load requirements remain the same, so the first kicker roller 100a and the second kicker roller 100b must still be able to achieve the needed lift force and travel with the their relatively compact size. In addition, each bolster structure 150 has to be strong enough to support the force placed on the first kicker roller 100a and the second kicker roller 100b, respectively.

The bolster structure 150 can be formed of two parallel beams 152, 154 extending outboard of the main support beams 12, 14 and between front axle 66 and the middle axle 64. The first kicker roller 100a and second kicker roller 100b are provided in the bolster structure 150 between the beams 152, 154.

Figure 5:
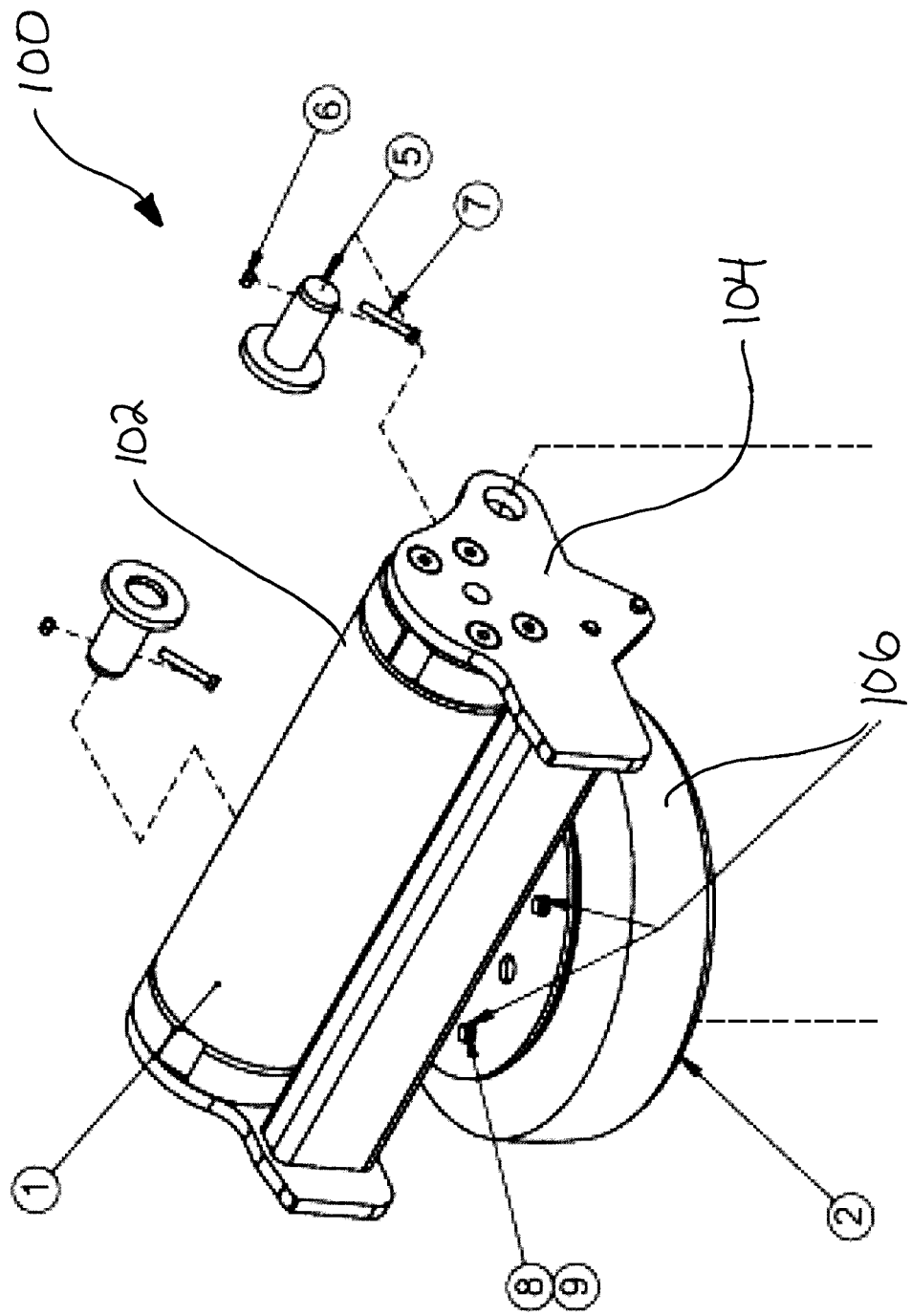
FIG. 5 is a perspective view of a kicker roller.

Referring to FIGS. 5-7, each kicker roller 100 can have a roller 102, a roller support flange 104 and an air bag 106. The roller 102 is a rotatable cylindrical body that can rotate freely to allow a load to "roll" over the kicker roller 100 when the roller 102 is extended above the top surface 42 of a decking 40. The roller support flange 104 rotatably supports the roller 102 and is connected to the air bag 106 as well as being pivotally attached to the bolster structure 150. The roller flange 104 can be pivotally attached to the beam 154 of the bolster structure 150 so that the kicker roller 100 can pivot relative to the beam 154. The air bag 106 can be provided attached to the roller support flange 104 and positioned below the roller 102 so that the roller support flange 104 operatively connects the air bag 160 and the roller 102. A support plate 156 can be attached to the bottoms of the beams 154, 156 and extending between the beams 154, 156 so that a bottom of the air bag 160 can is supported by the support plate 156. The air bag 106 can be inflated, increasing its height, and deflated, decreasing its height, thereby altering the height of the roller 102 operatively connected to the air bag 106 by the roller support flange 104.

Mud flaps 90 can hang down from the bolster structure 150.

The pivotable attachment of the roller support flange 104 to the bolster structure 150 at the beam 154 controls the movement of the roller 102 as the air bag 106 is inflated and deflated. By inflating the air bag 106, the roller 102 can be moved upwards, guided by the roller support flange 104 until the kicker roller 100 is in a loading position, with the roller 102 extending above the top surface 42 of the decking 40 so that load can roll over the kicker roller 100 when the load is being loaded onto the trailer 10 or unloaded from the trailer 10. By deflating the air bag 106, the roller 102 can be moved downwards, guided by the roller support flange 142, until the kicker roller 100 is in a transport position with the roller 102 retracted below the top surface 42 of the decking 40 so that a load can sit on the top surface 42 of the decking 40 without being in contact when the roller 102 on the kicker roller 100.

In operation, when a long rigid load, such as a 40' container, needs to be loaded onto the decking 40 of the trailer 10, a winch cable from the tow vehicle, running the length of the trailer 10, over the decking 40 can be connected to the load on a ground surface behind the trailer 10. The belly roller 80 can be positioned in the loading position with the roller 82 extending above the top surface 42 of the decking 40 so that the bottom of the load can roll along the roller 82 of the belly roller 88 and the rear roller 90 making it easier to winch the load across the deck assembly 30 towards the front end 32 of the deck assembly 30 of the trailer 10.

The load can then be winched up and onto the trailer 10 with the winch cable first rolling over the rear roller 90 on the trailer 10 until the front end of the load is winched up to the rear roller 90. The winch can then be continued to be wound, pulling the front end of the load up and over the rear roller 90, with the roller 92 rolling to allow the front end to move up and over the rear roller 90. When the front end of the load is winched up to the rear roller 90, the bottom of the load can roll over the rear roller 90 and the front end of the load is winched further and further towards a front end 34 of the decking 40. The load can continue to be pulled onto the trailer 10 by winding in the winch cable, with the load balancing on the rear roller 90 and the rolling of the rear roller 90 aiding the load being moved onto the decking 40 of the trailer 10.

When the load is winched far enough onto the decking 40 of the trailer 10, the weight of the load that has passed the rear roller 92 will be greater than the weight of the load that has not yet passed the rear roller 92 and the front end of the load can tip downward towards the decking 40 of the trailer 10 and eventually the front end of the load will tip downwards enough that it can come into contact with the trailer 10 with the load now lying prone on the decking 40 and being winched horizontally along the decking 40 of the trailer 10. If the load is of sufficient length, when the front end of the load tips downwards towards the decking 40 of the deck assembly 30 of the trailer 30, the front end of the load will extend past the belly roller 80 so that the bottom of the load comes into contact with the belly roller 80. The load can then be continued to be winched along the deck assembly 30 of the trailer 30 with the load rolling on the belly roller 80 and the rear roller 90.

When the load is in position on the deck assembly 30, the belly roller 80 can be positioned in the transport position with the roller 82 retracted below a top surface 42 of the decking 40 so that the load comes to rest directly on the decking 40 of the deck assembly 30.

To unload the long load, the belly roller 80 can be extended from the transport position to the loading position with the roller 82 extending above the top surface 42 of the decking 40 so that the load can roll along the roller 82 of the belly roller 80. The trailer 10 can be backed up by the tow vehicle and the brakes suddenly applied to cause the load to roll towards the rear end 34 of the deck assembly 30 of trailer 10. The winch can be used to control the movement of the load as it rolls towards the rear end 34 of the deck assembly 30.

When the back end of the load reaches the rear end 34 of deck assembly 30 of the trailer 10, the bottom of the load will roll onto the rear roller 90 and the back end of the load will continue to roll past the rear end 34 of the trailer deck assembly 30 and the rear roller 90 until enough of the weight of the load has passed the rear roller 90 that the back end of the load starts to tip downwards towards a ground surface behind the trailer 10 and the front end of the load starts to tip up off the decking 40 of the deck assembly 30 of the trailer 10. If the load is of sufficient length, when the front end of the load starts to lift off the deck assembly 30 as the back end of the load starts to tip downwards towards the ground surface, the bottom of the load will still be rolling along the belly roller 80. As the load continues to move backwards, the back end of the load will come in contact with the ground surface behind the trailer 10. The trailer 10 can then be pulled forward causing the entire load to come off of the rear end 34 of the deck assembly 30 and the rear roller 90, with the winch controlling the decent of the load onto the ground surface.

For shorter load, the first kicker roller 100a and the second kicker roller 100b can be used to help load and unload these shorter loads. For example, instead of loading a 40' load, two shorter 20' loads might be loaded on the decking 40 of the deck assembly 30 of the trailer 10. The use of the first kicker roller 100a and the second kicker roller 100b to load a shorter load can prevent the front of the shorter load coming into contact with the top surface 42 of the decking 40 and dragging along the decking 40 until the load reaches the belly roller 80 on the decking 40 of the trailer 10. Instead, the front end of the shorter load can come down on the first kicker roller 100a and the second kicker roller 100b, where the bottom of the load will roll over the first kicker roller 100a and the second kicker roller 100b until the front end of the load reaches the belly roller 80 on the decking 40 of the trailer 100. Similarly, when unloading a shorter load, the bottom of the shorter load can remain rolling on the first kicker roller 100a and the second kicker roller 100b and the rear roller 90 until the shorter load starts to tip over the rear roller 90 instead of dragging along the decking 40 of the trailer 10. This can solve the issue of a shorter load dragging along the top surface 42 of the decking 40 during unloading or the front of the shorter load coming down and hitting the decking 40 to be dragged along the decking 40 before it reaches the next roller on the deck assembly 30.

To load a shorter load, the first kicker roller 100a and the second kicker roller 100b can be placed in the loading position by extending the rollers 102 so that they extend above the top surface 42 of the decking 40 by inflating the air bags 106 and causing the height of the rollers 102 to increase until the rollers 102 protrude above the top surface 42 of the decking 40 of the deck assembly 30. The shorter load can then be winched up to the rear roller 90 and over the rear roller 90. However, because the load is shorter, with the rear roller 90 acting as a fulcrum for the shorter load, the front end of the shorter load will be not as far along the decking 40 when it starts to tip downwards towards the decking 40 as it would with a longer load and the front end of the shorter load may not reach the belly roller 80. However, when the front end of the shorter load tips towards the decking 40, the front end of the shorter load can be past the first kicker roller 100a and the second kicker roller 100b, even if it does not reach the belly roller 80, so that when the front end of the load comes down onto the decking 40 of the trailer 10, the bottom of the load can come into contact with the first kicker roller 100a and the second kicker roller 100b. The now prone shorter load can roll along the deck assembly 30 of the trailer 10, rolling on the rear roller 90 and the kicker rollers 100a, 100a as the shorter load rolls towards the belly roller 80. When the shorter load is in the desired position on the decking 40 of the trailer 10, the kicker rollers 100a, 100b and the belly roller 80 can be retracted below the top surface 42 of the decking 40 of the trailer 10 into their transport positions so that the shorter load rests on the top surface 42 of the decking 40.

In some cases it may be desirable to load two shorter loads onto the deck assembly 30 and the second shorter load can be connected to the first shorter load with a short length of cable or other connector connecting the front end of the second shorter load to the rear end of the first shorter load. The second shorter load can be pulled by the first shorted load onto the trailer 10 in the same manner as the first shorter load until the second shorter load is positioned on the deck assembly 30 behind the first shorter load. With the first and second shorter load in position on the deck assembly, the kicker rollers 100a, 100b and the belly roller 80 can be retracted below the top surface 42 of the decking 40 of the trailer 10 into their transport positions so that the first short load and the second shorter load rest on the top surface 42 of the decking 40.

To unload the shorter load, the first kicker roller 100a and the second kicker roller 100b can be placed in the loading position by extending the rollers 102 so that they extend above the top surface 42 of the decking 40 by inflating the air bags 106 and causing the height of the rollers 102 to increase until the rollers 102 protrude above the top surface 42 of the decking 40 of the deck assembly 30. The belly roller 80 can also be placed in the loading position with the roller 82 of the belly roller 80 extended above a top surface 42 of the decking 40. In this manner, the shorter load can roll along the belly roller 80, the first kicker roller 100a and the second kicker roller 100b.

To start unloading the shorter load, the tow vehicle can be used to back up the trailer 10 and the brakes suddenly applied to cause the shorter load to start to roll towards the rear end 34 of the deck assembly 30 of the trailer 10 and the rear roller 90. The winch and cable can be used to control the speed of shorter load. When the back end of the shorter load reaches the rear roller 90, it can roll over the rear roller 90 and the back end of the shorter load can continue to roll past the rear roller 90 behind the trailer 90 so that the back end of the shorter load is suspended in the air behind the trailer 10. With the rear roller 90 acting as a fulcrum for the shorter load, when enough of the weight of the shorter load has past the rear roller 90, the back end of the shorter load will start to tip downwards toward the ground surface behind the trailer and the front end of the shorter load will lift off of the deck assembly 30 of the trailer 10.

When the back end of the shorter load tips towards the ground surface behind the trailer 10, the front end of the shorter load can be past the first kicker roller 100a and the second kicker roller 100b so the bottom of the shorter load is still supported by the first and second kicker rollers 100a, 100b, instead of the front end of the shorter load dragging along the top surface 42 of the decking 40.

As the shorter load continues to move backwards, the back end of the shorter load will come in contact with the ground surface behind the trailer 10. The trailer 10 can then be pulled forward causing the shorter load to come off of the rear end 34 of the deck assembly 30 and the rear roller 90, with the winch controlling the decent of the shorter load onto the ground surface.

If two shorter loads were loaded on the deck assembly 30, the second shorter load can be unloaded from the trailer 10 in the same manner as the first shorter load, after the first shorter load is positioned on the ground surface behind the trailer 10.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A trailer comprising:
   a hitch assembly connectable to a tow vehicle;
   a deck assembly positioned behind the hitch assembly and having a front end, a rear end, a first side and a second side, the deck assembly comprising:
     decking having a top surface;
     an axle assembly having:
       at least two axles; and
       wheels provided on the at least two axles;
     a first kicker roller adjacent the first side of the deck assembly and positionable in a loading position with the first kicker roller extending above the top surface of the decking and a transport position with the first kicker roller retracted below the top surface of the decking; and
     a second kicker roller adjacent the second side of the deck assembly and positionable in a loading position with the second kicker roller extending above the top surface of the decking and a transport position with the second kicker roller retracted below the top surface of the decking,
   wherein the first kicker roller and the second kicker roller are positioned between the at least two axles,
   and wherein the first kicker roller is provided in a bolster structure and the second kicker roller is provided in a bolster structure,
   and wherein each bolster structure is defined by a pair of beams extending outboard from a pair of main beams of the trailer and the kicker roller is provided between the pair of beams.

2. The trailer of claim 1 wherein the first kicker roller and the second kicker roller are positioned substantially 12 feet from the rear end of the deck assembly.

3. The trailer of claim 1 wherein the first kicker roller and the second kicker roller are positioned less than 12 feet from the rear of the decking.

4. The trailer of claim 1 further comprising a third axle positioned between the at least two axles and the rear end of the deck assembly.

5. The trailer of claim 1 wherein the axle assembly comprises: a rear axle; middle axle; and front axle and the first kicker roller and the second kicker roller are positioned between the front axle and the middle axle.

6. The trailer of claim 1 wherein the rear end of the deck assembly is substantially equidistant from the first kicker roller and the second kicker roller.

7. The trailer of claim 1 wherein the first kicker roller partially extends across a width of the deck assembly and the second kicker roller partially extends across a width of the deck assembly, defining a space between the first kicker roller and the second kicker roller.

8. The trailer of claim 1 wherein each kicker roller comprises: a roller; and an air bag, the air bag inflatable to increase a height of the roller and place the kicker roller in the loading position and deflatable to decrease the height of the roller and place the kicker roller in the transport position.

9. The trailer of claim 8 wherein each kicker roller further comprises: a roller support flange pivotally connected to the roller of the kicker roller and operatively connecting the roller of the kicker roller and the air bag, the roller support flange pivotally connected to a bolster structure on the trailer.

10. The trailer of claim 9 wherein each kicker roller is provided in the bolster structure, and wherein the bolster structure is defined by a pair of beams extending outboard from a pair of main beams of the trailer and the kicker roller is provided between the pair of beams, and wherein the roller support flange of the kicker roller is pivotally attached to one of the beams.

11. The trailer of claim 1 further comprising a belly roller provided in the decking between a front end of the deck assembly and the first kicker roller and the second kicker roller.

12. The trailer of claim 11 wherein the belly roller is provided closer to the front end of the deck assembly than the rear end of the deck assembly.

13. The trailer of claim 11 wherein the belly roller further comprises a retractable roller running substantially a full width of the decking of the deck assembly.

14. The trailer of claim 13 wherein the retractable roller is positionable in a loading position with the retractable roller extending above the top surface of the decking and positionable in a transport position with the retractable roller retracted below the top surface of the decking.

15. The trailer of claim 1 further comprising a rear roller positioned at the rear end of the deck assembly, the rear roller having a roller extending substantially a full width of the decking and freely rotatable.

16. The trailer of claim 1 wherein the first kicker roller and the second kicker roller are the only kicker rollers provided on the trailer.

17. The trailer of claim 16 further comprising a belly roller running substantially a full width of the decking of the deck assembly.

* * * * *